United States Patent
Scheibenpflug et al.

(10) Patent No.: US 8,973,745 B2
(45) Date of Patent: Mar. 10, 2015

(54) CARRIER ELEMENT FOR ARTICLES OR CONTAINERS

(71) Applicant: Krones Aktiengesellschaft, Neutraubling (DE)

(72) Inventors: Robert Scheibenpflug, Pfatter (DE); Martin Seger, Neumarkt i. d. Opf. (DE)

(73) Assignee: Krones Aktiengesellschaft, Neutraubling (DE)

( * ) Notice: Subject to any disclaimer, the term of this patent is extended or adjusted under 35 U.S.C. 154(b) by 16 days.

(21) Appl. No.: 13/742,786

(22) Filed: Jan. 16, 2013

(65) Prior Publication Data

US 2013/0180834 A1    Jul. 18, 2013

(30) Foreign Application Priority Data

Jan. 16, 2012    (DE) .................. 10 2012 100 318

(51) Int. Cl.
| | | |
|---|---|---|
| *B65G 29/00* | (2006.01) | |
| *B65G 17/32* | (2006.01) | |
| *B65B 43/60* | (2006.01) | |
| *B65G 47/84* | (2006.01) | |
| *B67C 3/24* | (2006.01) | |
| *B67C 7/00* | (2006.01) | |
| *B65B 43/46* | (2006.01) | |

(52) U.S. Cl.
    CPC ................ *B65G 17/32* (2013.01); *B65B 43/60* (2013.01); *B65G 47/846* (2013.01); *B67C 3/24* (2013.01); *B67C 7/0006* (2013.01); *B65B 43/46* (2013.01); *B65G 2201/0261* (2013.01)
    USPC .................................... 198/867.01; 198/465.1

(58) Field of Classification Search
    USPC ............. 198/867.01, 867.09, 867.14, 867.15, 198/465.1
    See application file for complete search history.

(56) References Cited

U.S. PATENT DOCUMENTS

| | | | |
|---|---|---|---|
| 3,941,237 A | | 3/1976 | MacGregor, Jr. ................ 198/41 |
| 4,473,989 A | * | 10/1984 | Tsutsumi et al. ................ 53/459 |
| 4,815,673 A | * | 3/1989 | Wheeler ..................... 198/346.1 |
| 5,484,052 A | * | 1/1996 | Pawloski et al. ......... 198/867.05 |
| 5,509,524 A | * | 4/1996 | Ohmori et al. ............. 198/465.1 |
| 5,687,874 A | * | 11/1997 | Omori et al. ................... 220/737 |
| 5,727,369 A | | 3/1998 | Mosse ............................. 53/467 |
| 5,730,276 A | * | 3/1998 | Itoh ............................ 198/465.1 |
| 5,897,090 A | * | 4/1999 | Smith et al. ................. 248/311.2 |

(Continued)

FOREIGN PATENT DOCUMENTS

| | | |
|---|---|---|
| DE | 19727355 | 1/1999 |
| DE | 694 16 130 | 9/1999 |
| DE | 101 27 107 | 12/2002 |
| DE | 10 2008 020 117 A1 | 4/2008 |
| EP | 0535946 | 4/1993 |
| EP | 057486 | 1/1994 |
| EP | 0727367 | 8/1996 |

(Continued)

*Primary Examiner* — William R Harp
(74) *Attorney, Agent, or Firm* — Davidson, Davidson & Kappel, LLC

(57) ABSTRACT

A carrier element (20) for receiving and transporting articles (10) or containers within a production facility. The carrier element (20) includes a receiving portion (22) with a receiving opening (24) for the article (10) or the container. The carrier element (20) includes a fastening portion (30), which is arranged spatially separate from the receiving portion. The fastening portion (30) includes at least one hollow inside area (34) and at least one opening (40) in a section of the outer casing (31). This opening (40) provides an open connection to the inside area (34) of the fastening portion (30). At least one functional surface (45) is arranged in the hollow inside area (34) for the purpose of creating a force-locking and/or form-locking connection to a coupling device (50) of the production facility.

15 Claims, 10 Drawing Sheets

(56) References Cited

U.S. PATENT DOCUMENTS

| | | | | |
|---|---|---|---|---|
| 6,068,110 | A * | 5/2000 | Kumakiri et al. | 198/803.14 |
| 6,175,369 | B1 | 1/2001 | Dyer et al. | 345/433 |
| 6,176,369 | B1 * | 1/2001 | Petrovic | 198/867.11 |
| 6,763,928 | B2 * | 7/2004 | Girotto et al. | 198/411 |
| 7,485,264 | B2 * | 2/2009 | Itoh | 422/562 |
| 8,132,664 | B2 * | 3/2012 | Paskell et al. | 198/803.14 |
| 8,205,743 | B2 | 6/2012 | Meinzinger et al. | 198/867.14 |

| | | | |
|---|---|---|---|
| 2007/0241151 | A1 | 10/2007 | Murray ......... 224/407 |

FOREIGN PATENT DOCUMENTS

| | | |
|---|---|---|
| EP | 1 283 172 | 2/2003 |
| JP | H10398826 | 4/1991 |
| JP | H10236448 | 9/1998 |
| WO | WO 95/30 611 | 11/1995 |
| WO | WO 95 30 611 A1 | 11/1995 |

* cited by examiner

Fig. 1      (Prior Art)

CARRIER ELEMENT FOR ARTICLES OR CONTAINERS

This claims the benefit of German Patent Application DE 10 2012 100 318.1, filed Jan. 16, 2012 and hereby incorporated by reference herein.

The present invention relates to a carrier element for transporting and/or processing articles or containers in a production facility.

BACKGROUND

Containers, such as bottles or canisters made of glass, plastic, metal, or cardboard, are filled with respectively predefined contents and/or packaged, labeled, etc. in processing facilities and, in particular, in filling facilities. In order to ensure correct processing, the containers are guided along specified transport tracks. In such processes, the transportation of the containers is preferably effected automatically. For the purpose of effecting such automatic transportation of the containers, the facilities have guide rails, screw conveyors, transport stars, conveyor belts, or the like. The transportation elements, for instance the transport stars, are frequently equipped with gripping means allowing for safe transfer of the containers from one processing module to a subsequent processing module. There exist, however, specific article or container forms for which it is either not possible or difficult to employ gripping elements. One such instance are filled infusion bags, which do not lend themselves to being picked up and passed on with grippers, as this would involve a high risk of the grippers damaging the infusion bags. This in turn would cause the contents to leak out of the infusion bag or at least to become contaminated and therefore useless. Special carriers or carrier elements are used to prevent this from happening. These carrier elements particularly serve for transporting such containers safely through the production facility.

The carrier elements in particular comprise a receiving portion for receiving the containers or bottles, said receiving portion being preferably designed as to be adjustable. This implies that adjustment means are provided in the receiving portion, said adjustment means serving for adapting the receiving portion to the container to be transported.

Such carrier elements are also used, for instance, for containers or bottles with an irregular geometry, i.e. in particular a geometry that is not circular or broadly square, so that said containers or bottles would otherwise require a precise alignment before they could be held by means of gripper elements. Employing carrier elements therefore makes it possible to dispense with an appropriate sensor system and/or alignment device. The carrier elements are designed in such a way that they are, for instance, open toward the top so that they can be used as bottle carriers with the possibility of inserting the containers or bottles from above.

The carrier elements are commonly made of plastic and are provided with functionally important properties; they may, for instance, comprise gripping portions for transfer devices on their outer cover surfaces, or sliding portions for being guided in the production facility.

As they pass through the production facility a number of times, the carrier elements are exposed to high strain in the production facility throughout their entire product life cycle. Damages to the functional surfaces of the carrier elements are likely to occur. The inserted container remains safely protected despite such damages to the outer cover surface of the carrier element. Should the functional surfaces be damaged too much, it is no longer possible to employ the carrier element, as it will no longer ensure faultless transfer from one processing module to a subsequent processing module within the production facility, for instance in a star-to-star transfer. A further problem lies in that soiling of the functional surfaces of the carrier element during the transportation process may lead to a faulty transfer from one processing module to a subsequent processing module. Leakages of semi-liquid and/or sticky contents may cause soiling to the functional surfaces, for instance.

In the transferring process of the known carrier elements, gripper elements are used, which engage with so-called contact surfaces of the outer cover surface of the carrier elements. The result is a relatively sizable transfer unit consisting of carrier element and gripping element.

DE 10 2008 020 117 A1 describes a carrier for conveying a container having a base that can be stood on the conveying surface of the conveying line and having at least one holding means for holding the container. Only the top portion of the container is supported in this carrier so that the carrier is versatilely usable for various container designs.

WO 1995 030 611 A1 shows a carrier element into which the containers are placed for transportation purposes. For positioning, the carrier element comprises the specifically formed portions 32d, 32e of the lower outer cover surface, said portions engaging with corresponding guide rails, for instance. The outer cover surface of the carrier element furthermore comprises the cavities 32b, 32c. By using an appropriate sensor system, it is possible to check the correct alignment of the carrier element via the alignment of these cavities.

SUMMARY OF THE INVENTION

It is an object of the present invention is to provide a carrier element for articles or containers, which allows a simple transfer from a first to a second processing module within a production facility, and which is largely resistant to external damages at the same time.

The invention provides a carrier element for receiving and transporting articles or containers within a production facility. In particular, the carrier element serves for receiving liquid containers and for transporting them through a filling and/or packaging facility. Such carrier elements are employed particularly for preventing a direct contact between the articles and the transfer means, for instance grippers, or the like, during the transfer process from one processing module to the next processing module. Such carrier elements are also employed for articles or containers that are difficult to grip directly and safely due to their form or other properties. By means of such carrier elements it is possible to safely process such articles which, for instance, do not have an even standing base or which have a standing base that is relatively small in comparison to the height of the articles so that they will easily topple.

The carrier element comprises a receiving portion with a receiving opening for the article or the container. It is further possible for specific adjustment means to be provided in the receiving portion for adapting said receiving portion to the respectively transported article or container so that it is retained safely and stably in the carrier element. In particular, certain production steps may require that the article or container is secured more or less immovably in its position in the carrier element. If the article or container is, for instance, suspended hanging from the carrier element, it is necessary to provide further specific holding means so that the article is held safely to the carrier element.

According to the invention, the carrier element comprises a fastening portion, which is arranged spatially separate from the receiving portion. The fastening portion comprises at least one hollow inside area. This inside area comprises at least one connection that is open to the outside. In particular, there is at least one opening in the outer casing of the fastening portion, with said opening forming the open connection to the inside. For the purpose of creating a force- and/or form-locking connection to a coupling means of the production facility, at least one functional surface is arranged in the hollow inside area. From this ensues that the at least one coupling means of the production facility is inserted or enters through the opening in the outer casing of the carrier element's fastening portion. The coupling means can then form a force- and/or form-locking connection with the functional surface on the inside of the carrier element.

According to a preferred embodiment of the connection, the receiving portion is arranged above the fastening portion of the carrier element. The receiving portion comprises a receiving opening that is open at the top and serves for receiving the article or container. The fastening portion comprises at least one opening in a section of the outer casing that is arranged vertically to the horizontal plane. In particular, the fastening portion is formed broadly cuboid or cube-like, with the opening being disposed in a lateral section of the outer casing. This opening is the required open connection to the inside of the fastening portion, allowing the coupling means of the production facility to enter into the inside area.

According to a further embodiment of the invention, it is possible to arrange the receiving portion and the fastening portion so that they are disposed adjacent to each other. The orientation of the carrier element is important in the fastening process, for instance when the carrier element is gripped by fastening means or coupling means belonging to the production facility. The fastening portion has to face toward the fastening or coupling means of the production facility at that point in order to avoid damage by said fastening or coupling means to the article being held. According to a third embodiment of the invention, the fastening portion is arranged above the receiving portion and the articles are transported in a suspended position. This allows holding and transporting, for instance, liquid-filled pouches, or the like. Such pouches may have a screw cap at the top. The receiving portion may provide specific holding means for safely gripping and fastening the pouch above or at the screw cap before transporting it in a suspended position.

The at least one functional surface disposed in the inside area of the carrier element is designed to correspond to a coupling surface of a coupling means of the production facility. In particular, two functional surfaces may be provided, with said functional surfaces being arranged broadly opposite each other in the inside area of the fastening portion and designed to correspond to coupling surfaces of the coupling means.

According to one embodiment, the functional surfaces are designed as curvatures, forming concavities or convexities. The coupling means of the production facility can be designed, for instance, as gripping means, in particular as gripping clamps or gripping pliers with two gripping arms each. At their distal ends, the gripping arms comprise gripping surfaces, which are designed to correspond to the functional surfaces inside the carrier elements. The gripping surfaces of the gripping means and the functional surfaces of the carrier elements thus serve for producing form-stable and/or force-stable clamp connections.

As an alternative, the functional surface may be designed with a magnetic function and thus equipped with a magnetic means. The corresponding coupling surfaces of the production facility's coupling means are then accordingly allocated to corresponding magnetic means. In this way it is possible to create a magnetically locking and/or form-locking connection between the carrier element's functional surface and the coupling surface. A combination of form lock and magnetic lock enables a particularly safe and guided transfer of the carrier element.

Preferably, the inside surfaces of the outer casings of the fastening portions comprise at least two functional surfaces. The arrangement thereof is, in particular, designed to be mirror-symmetrical with regard to each other. With a square-shaped fastening portion, for instance, the functional surfaces are preferably arranged on those sides of the inside area that are disposed in perpendicular relation to that section of the outer casing which contains the at least one opening provided for insertion of the coupling means into the inside area. The two gripping arms of a clamp gripper are at least partly inserted into the inside area of the carrier element's fastening portion through the at least one opening. Alternatively, the carrier element is at least partly fitted over the gripping arms. The gripping arms are opened by moving the distal ends of the gripping arms so far apart until the gripping surfaces engage with the corresponding functional surfaces of the carrier element. The clamp gripper is secured or braced in this position and the carrier element is thus held tight by the clamp gripper. In order to disconnect the carrier element from the clamp gripper, the fixation of the gripping arms is first loosened and then the gripping arms are at least partly closed. The carrier element can then be pulled off from the gripper arms or the gripper arms can be pulled out of the carrier element.

According to a further embodiment, the fastening portion comprises a stabilizing partition wall. The wall divides the fastening portion into two more or less identical inside areas. Here it is possible for the at least two functional surfaces to be arranged at the side surfaces of the partition wall; in particular, the at least two functional surfaces are then largely mirror-symmetrically to each other and mirror-symmetrically to a plane of symmetry formed by the partition wall and/or running in parallel to the partition wall. The fastening portion then necessarily comprises at least two openings, with each of the openings being allocated to one of the two hollow inside areas and forming an open connection thereto. The gripper arms of the clamp gripper are at least partly inserted, simultaneously and each through one of the two openings, into the respective inside area of the fastening portion. Alternatively, the carrier element is at least partly fitted over the gripping arms. The gripping arms are then closed by moving the distal ends of the gripping arms so far together until the gripping surfaces engage with the corresponding functional surfaces of the carrier element. The clamp gripper is secured or braced in this position and the carrier element is thus held firmly clamped by the clamp gripper. In order to disconnect the carrier element from the clamp gripper, the fixation of the gripping arms is first loosened and then the gripping arms are at least partly opened. The carrier element can then be pulled off from the gripper arms or the gripper arms can be pulled out of the carrier element.

The contact surfaces or functional surfaces can be arranged at the carrier element in both, a vertical or a horizontal disposition. It is also possible to arrange them in intermediate planes between the vertical and horizontal disposition. According to a further embodiment, the carrier elements comprise openings in the bottom side of the lower receiving portion. In this case, the coupling means, for instance the gripper arms, enter into the inside area from below.

Further advantageous embodiments comprise first functional surfaces that serve for creating a first connection to a first coupling means and second functional surface that serve for creating a second connection to a second coupling means. The fastening portion comprises openings disposed at opposite outer sides, for instance. The first coupling means of the production facility can engage with the first functional surfaces in the inside area of the carrier element through the first openings in one outer side, while the second coupling means of the production facility can engage with the second functional surfaces in the inside area of the carrier element through the second openings in the opposite outer side Furthermore, it is conceivable that first coupling means enter into the inside area and create an operative connection to the first functional surfaces through openings in the bottom side of the receiving portion, while second coupling means enter into the inside area and create an operative connection to the first functional surfaces through lateral openings of the receiving portion. Special attention needs to be paid that the lateral openings are arranged above the first functional surfaces to prevent collisions between the first and the second coupling means.

The transfer of the carrier elements can be designed particularly advantageously, for instance, by equipping the first functional surfaces and the coupling means each with magnetic means and by forming the second functional surfaces as gripping surfaces and the second coupling means each as mechanical gripping elements. In this way, the transfer from a first to a second conveying or processing module can be performed magnetically, while the transfer from the second to a third conveying or processing module is performed mechanically.

The carrier element according to the present invention has the functional surfaces, which come into contact with the coupling means and/or the transfer means of the production facility, arranged to be protected in the inside area of the fastening portion. External damages or deformations as well as material loss at the carrier element, for instance by skewed articles in the infeed screws or by sudden machine stop etc., will take no effect on the functional surfaces inside the fastening portion. The functional surfaces continue to remain usable, making replacement of the carrier element unnecessary. In this way, the lifetime of the carrier element is significantly extended. Due to the selected geometry, soiling of the inside functional surfaces can be prevented to the utmost, thus achieving an extended period of service life and improved hygienic conditions.

According to a further embodiment, provisions are made for the carrier element, firstly, to comprise a first functional surface arranged in the inside area. As described, gripping means, or the like, enter into the processing modules of the production facility through openings in a first outer cover portion into the inside area of the carrier element and, by means of the functional surfaces, create a form- and/or force-locking connection between the carrier element and the processing module. Secondly, provisions are made for magnetic means so that it is possible to create a magnetic connection between the carrier element and a further processing module. In this instance, this involves magnetic means engaging from the outside to create an external magnetic coupling. In particular, magnetic means are allocated to a second outer cover portion of the carrier element. The magnetic means are preferably arranged in a second outer cover portion, which is located more or less opposite to the first outer cover portion with the openings into the inside area.

The transfer from the first processing module, where the carrier elements are being held by gripping means that engage with functional surfaces in the inside area, to a second processing module, where the carrier elements are being held by externally engaging magnetic means, is described as follows:

The interaction of the functional surfaces and the gripping means of the first processing module in holding the carrier elements has already been described in detail above. The second processing module in this embodiment comprises magnetic means, which engage from the outside with the carrier element. In particular, these magnetic means are, for instance, arranged in pockets or recesses, or the like, which are at least partly formed to correspond to the form of the carrier elements. The carrier elements are laterally inserted into the pockets or recesses and safely fastened, by way of the second outer cover portion, to the second processing module by a magnetic force lock effected between the corresponding magnetic means of the carrier element and the processing module. The form- and/or force-locking connection between the inside functional surfaces of the carrier element and the gripping means of the first processing module is loosened so that the carrier element can then be transported, processed, etc. by the second processing module.

The second processing module can have a star-shaped or linear structure, comprising, for instance, a transport star or a linear conveyor. In particular, it is possible to arrange so-called carrier pockets or transport recesses for carrier elements at a revolving conveyor chain. Such a carrier element in turn enables an alternating transfer, with the carrier element being transferred, for instance, from a first processing module with gripping means engaging in the inside, to a second processing module with magnetic means engaging from the outside, and subsequently to a third processing module with gripping means engaging in the inside.

It is also conceivable that the transfer from a first transport star or a linear conveyor with carrier recesses, pocket recesses, or transport recesses to a second transport star or linear conveyor with carrier recesses, pocket recesses, or transport recesses is performed using magnetic means that engage only from the outside at both sides of the carrier element. It is also possible to use a magnetic coupling on only one side of the carrier element for transporting it through a transport star or linear conveyor with carrier recesses, pocket recesses, or transport recesses. It is to be understood that all combinations of transport stars, linear conveyors, and conveyor carousels are included in this principle.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

DETAILED DESCRIPTION

Figure 1:
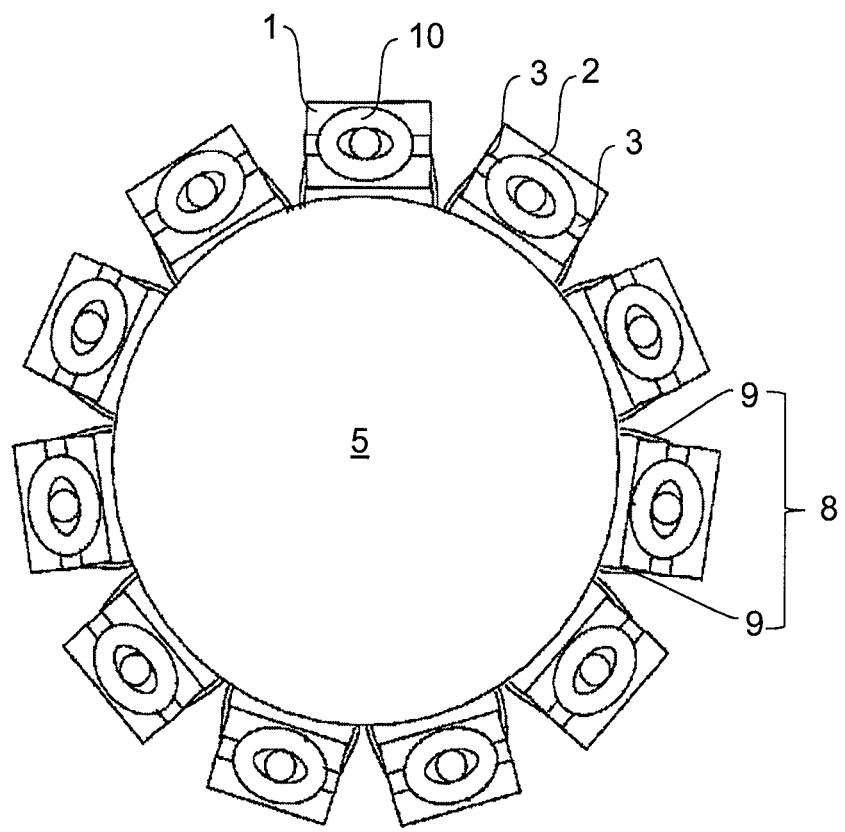
FIG. 1 shows the fastening of carrier elements to a transport star according to the known prior art.

The same or equivalent elements of the invention are designated by identical reference characters. Furthermore and for the sake of clarity, only the reference characters relevant for describing the respective figure are provided. It should be understood that the detailed description and specific examples of the device according to the invention, while indicating preferred embodiments, are intended for purposes of illustration only and are not intended to limit the scope of the invention.

FIG. 1 shows the fastening of carrier elements 1 for articles 10 to a transport star 5 according to the known prior art. The carrier elements 1 are commonly made of plastic and are provided with functionally important properties. They firstly comprise a receiving unit 2 for the articles 10. Adjustment devices 3 are provided in this connection, allowing the receiving unit 2 to be adjusted in size and form to the respective articles 10.

The transport star 5 comprises gripping means 8 with gripping arms 9, which engage from the outside with the carrier elements at their outer cover surfaces. This makes it necessary to have a certain minimal distance between the carrier elements 1 so that adjacent gripping means 8 do not impede and/or damage each other. The result is a relatively sizable transfer unit consisting of carrier element 1 and gripping elements 8. Damages to the functional surfaces of the carrier elements 1 are likely to occur with the gripping means 8 being arranged on the outside. External damages or deformations as well as material loss at the carrier element result, for instance, by skewed articles in the infeed screws or by sudden machine stop. Despite such damages to the outer surface cover or the carrier element 1, the container 10 disposed in the receiving unit 2 remains safely protected. In the instance of the functional surfaces being damaged, it is no longer possible to employ the carrier element 1, as it will no longer ensure faultless transfer from one processing module to a subsequent processing module, for example in a star-to-star transfer.

Figure 2:
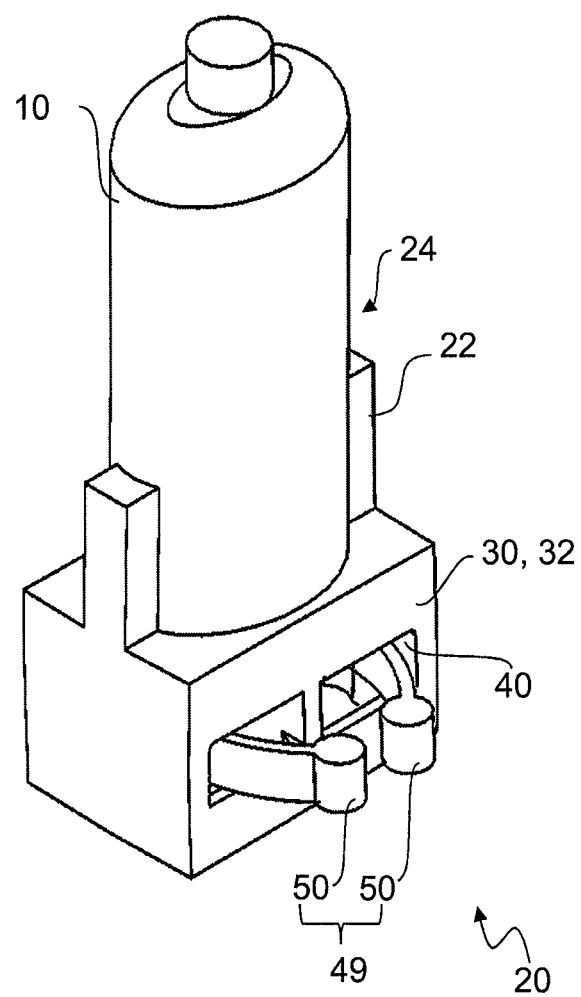
FIG. 2 shows a carrier element according to the invention.

FIG. 2 shows a carrier element 20 according to the invention. Said carrier element 20 comprises an upper receiving portion 22 with a receiving opening 24 at the top. Adjustment devices can be provided, allowing the receiving unit 22 or the receiving opening 24 to be adjusted in size and form to the respective articles 10.

The carrier element 20 further comprises a lower holding or fastening portion 30. Said fastening portion 30 comprises a hollow inside area. At least one, preferably two contact surfaces or functional surfaces are disposed in this hollow inside area. The outer cover surface 32 of the holding portion 30 comprises at least one opening 40, which forms a connection to the hollow inside area, allowing further functional parts to enter from the outside into the inside area.

According to the illustrated embodiment, two openings 40 are provided, through which gripping means can be inserted into the inside area of the carrier element. A pair of grippers, in particular a so-called clamp gripper 49 with two gripping arms 50, may, for instance, be used as a gripping means. In this way, the gripping means can engage with the functional surfaces arranged in the inside area through the openings 40. The gripping means are associated with, for instance, a transport star or another transportation device in the production facility, for example, a preferably linear transfer chain. The carrier element 20 is fitted over the gripping arms 50 or the gripping arms 50 are inserted into the inside area of the carrier element with the gripping arms 50 being in a first, relaxed state. The carrier element 20 is subsequently force- and/or form-stably held by the gripping arms 50. After this, it is possible to transport and/or process the carrier element 20 within the production facility, together with the article 10 arranged at the carrier element 20. In this way, the articles 10 can be safely fed to further production steps. Advantageously, it will never be necessary to directly grip the articles 10 during transportation through the production facility.

According to the invention, the functional or contact surfaces that come into contact with the gripping arms 50 are arranged to be protected in the inside area of the holding portion 30. External damages or deformations as well as material loss at the carrier element 20, for instance by skewed articles in the infeed screws or by sudden machine stop, will take no effect on the functional surfaces inside the holding portions 30. The functional surfaces continue to remain usable, making replacement of the carrier element 20 unnecessary. In this way, the lifetime of the carrier element 20 is significantly extended. Due to the selected geometry, soiling of the inside functional surfaces can be prevented to the utmost, thus achieving an extended period of service life.

Figure 3:
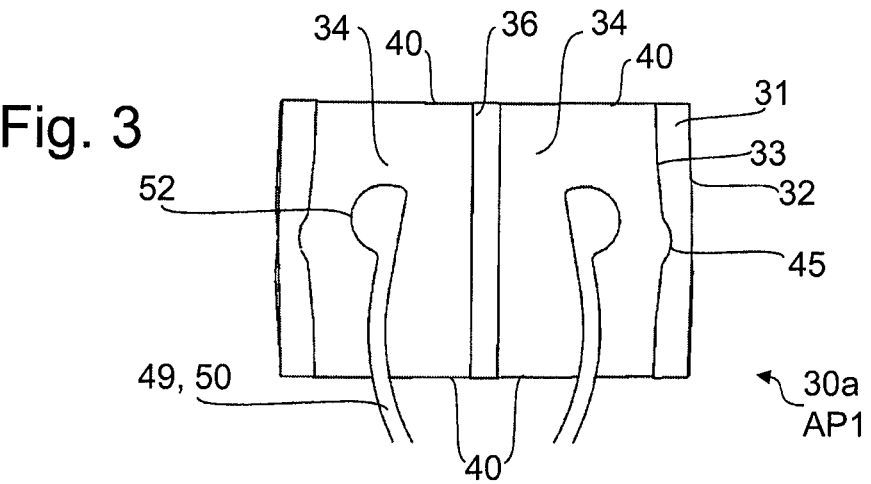
FIGS. 3 to 10 each show a horizontal section through the holding portion of a carrier element according to the invention.
Figure 4:
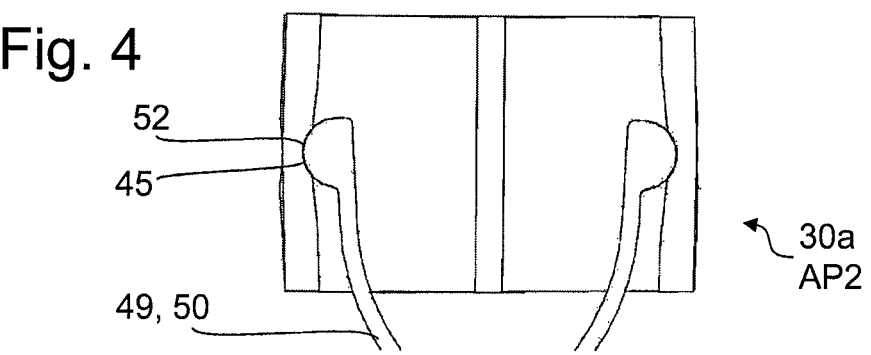

FIGS. 3 to 9 each show a horizontal section through the holding portion 30 of a carrier element 20 according to the invention. FIGS. 3 and 4 each show a first embodiment. The holding portion 30a is divided into two inside areas 34, with a stabilizing partition wall 36 arranged between said inside areas 34. The outer casings 31 comprise an outer cover surface 32 (also cf. FIG. 2) and an inside surface 33. One contact surface 45 is arranged in each of the inside surfaces 33, which are opposite each other.

Two outer casings 31 opposite each other and belonging to the holding portion 30a each comprise openings 40 that are disposed opposite each other. The openings 40 are, in particular, arranged in sections of the outer casing 31 that are largely perpendicular to the sections of the outer casing 31 with the contact surfaces. It is alternatively possible that only one of the outer casings 31 comprises openings 40 for gripping means 49 to engage with the inside area (cf. FIG. 5).

The gripping arms 50 of a gripping means 49 can enter into the inside area 34 in the holding portion 30 of the carrier element 20 through the openings 40. FIG. 3 shows a first, open operating state AP1, wherein the gripping arms 50 are only partly inserted into the inside area 34, but not yet braced in position. The contact surfaces 45 are in each case contour adjusted to the shape of the grippers, in particular to the contours of the distally arranged gripping surfaces 52. The gripping arms 50 are moved apart by actuating the gripping means 49. By doing so, the gripping means 49 is converted to a second, braced, or closed operating state AP2, wherein the gripping surfaces 52 form a form- and force-locking operative connection to the contact surfaces 45. The carrier element 20 is thus safely and firmly held at the gripping means 49, enabling smooth transfer, conveyance, etc. of said carrier element.

Figure 5:
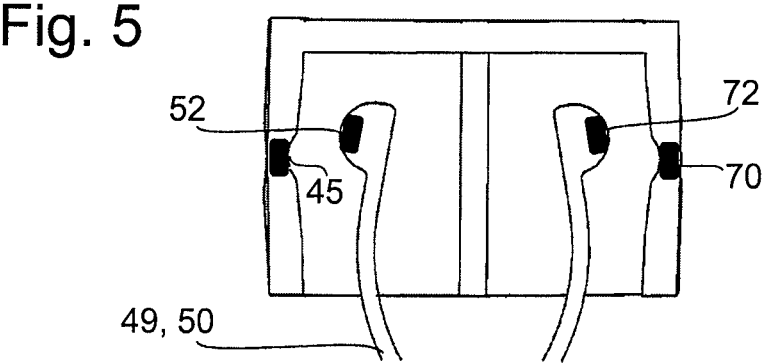
Figure 6:
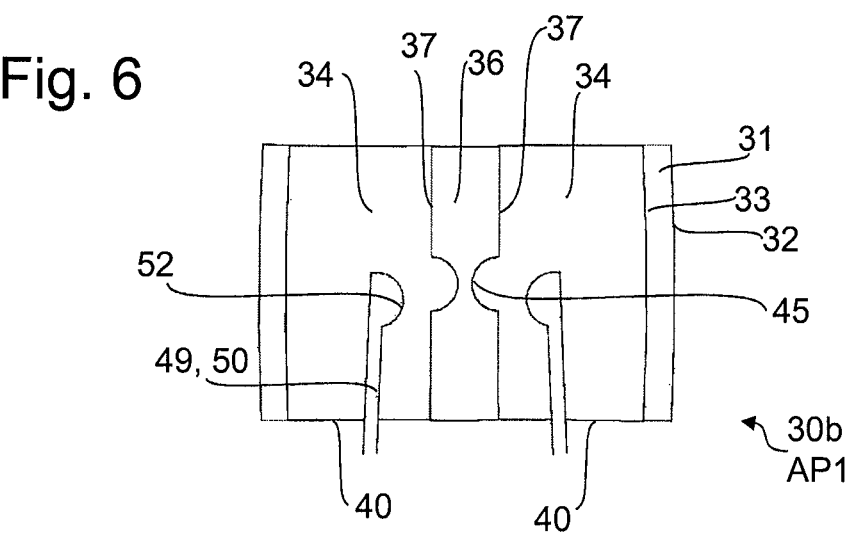
Figure 7:
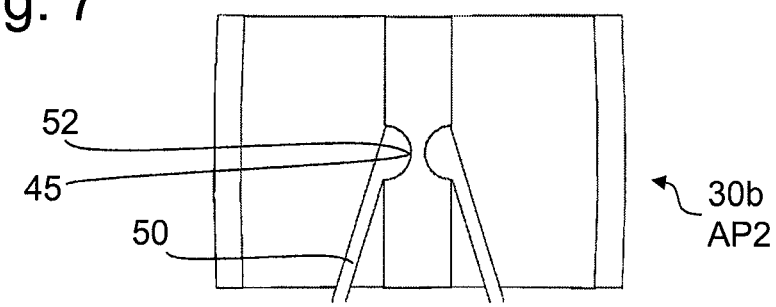

FIGS. 6 and 7 show a second embodiment of a holding area 30b. This holding portion 30b is also divided into two inside areas 34, with a stabilizing partition wall 36 arranged between said inside areas 34. In this embodiment, the contact surfaces 45 are allocated to the side surfaces 37 of the partition wall 36, said side surfaces 37 being disposed opposite each other. This partition wall 36 therefore advantageously has a thicker structure than the partition wall 36 according to the FIGS. 3 to 5. In this instance, the gripping surfaces 52 of the gripping arms 50 are first inserted into the inside area 34 of the holding portion 30b through the openings 40. The gripping arms 50 are then moved toward each other and thus brought together, resulting in a form- and force-locking operative connection between the gripping surfaces 52 and the contact surfaces 45 of the partition wall 36. The gripping arms 50 thus grip the partition wall 36 of the holding portion 30b.

Figure 8:
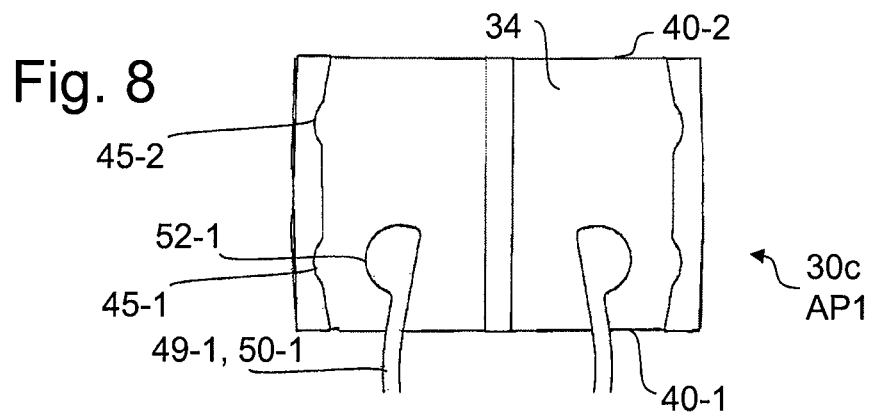
Figure 9:
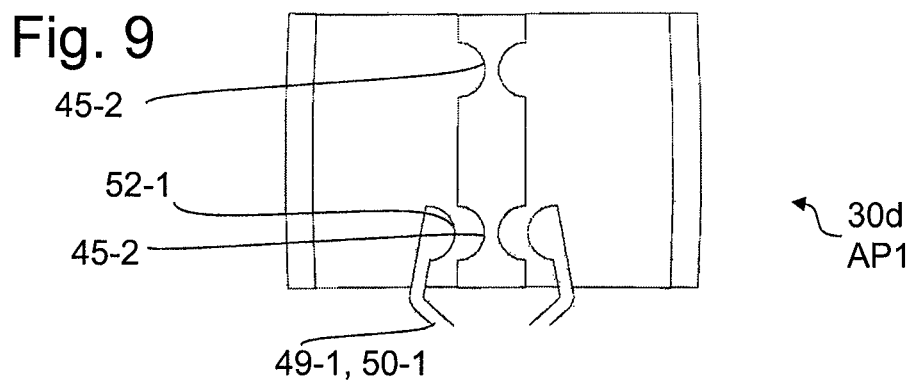

The contact surfaces 45 in the FIGS. 3 to 7 are each arranged in the center of the respective inside surfaces 33 or side surfaces 37. FIGS. 8 and 9 show embodiments with always two contact surfaces 45-1 and 45-2 arranged at each inside surface 33 or side surface 37. In the third embodiment of a holding portion 30c according to FIG. 8, the contact surfaces 45 are allocated to the inside surfaces 33 of the outer casings 31 so that the gripping arms 50 of a gripping means 49 have to be braced apart in order to effect a safe hold of the carrier element. In the fourth embodiment of the holding portion 30d according to FIG. 9, the contact surfaces 45 are allocated to the side surfaces 37 of the partition wall 36 so that the partition wall 36 is clamped by the gripping arms 50 of the gripping means 49 in order to effect a safe hold of the carrier element. Provided the same gripping means 49 are used throughout, carrier elements with holding portions 30c, 30d can be easily transferred from a first transportation means onto a second transportation means or processing module, or the like, such as from a first transport star to a second transport star, from a transport star to a conveyor belt or vice versa, in a transfer between a screw conveyor and a transport star, etc.

The carrier element is held at the first transportation means by a first gripping means 49-1 with first gripping arms 50-1. The first gripping arms 50-1 enter at least partly into the inside area 34 through first openings 40-1 in a section of the outer casing of the holding means 30c, 30d. By actuating the first gripping means 49-1, the gripping arms 50-1 can be converted to the operating state AP2 (cf. FIGS. 4 and 7), in which there is a form- and force-locking operative connection between the first gripping surfaces 52-1 and the first contact surfaces 45-1. During transfer of the carrier element with the article onto a second transportation means, second gripping arms of a second gripping means (not illustrated here) are at least partly inserted into the inside area 34 through second openings 40-2. By actuating the second gripping means, the second gripping arms can be converted to the operating state AP2 (cf. FIGS. 4 and 7). After loosening the first gripping means 49-1, the first gripping arms 50-1 can be removed through the openings 40-1. The carrier element and thus also the article arranged at the carrier element is now being held by the second gripping means at the second transportation means.

Figure 10:
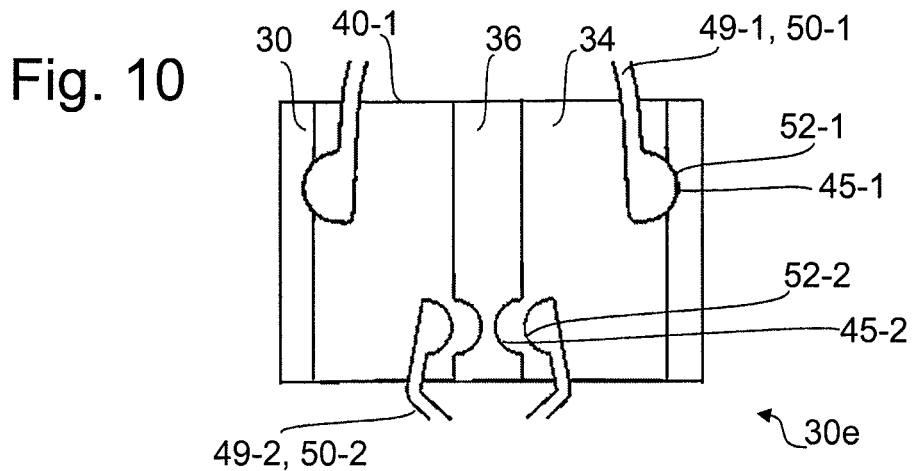

FIG. 10 shows a fifth embodiment of a holding portion 30e wherein contact surfaces 45-1 for a first gripping means 49-1 with gripping arms 50-1 are provided at the inside areas 33 of the outer casings 31 of the holding portion 30e, while second contact surfaces 45-2 for the second gripping means 49-2 with gripping arms 50-2 are provided each at the side surfaces 37 of the partition wall 36 of the holding portion 30e. Transfer of the carrier element from a first transportation means with first gripping means 49-1 onto a second transportation means, processing module, etc., with second gripping means 49-2 is performed analogously to the description of the embodiments in FIGS. 8 and 9. Employing such two-fold means of gripping as in the embodiments 30c, 30d, 30e, makes transfer particularly simple and safe.

The contact surfaces or functional surfaces 45 can be arranged at the carrier element in both, a vertical or a horizontal disposition. It is also possible to arrange the contact or functional surfaces 45 in intermediate planes between the vertical and horizontal disposition. The FIGS. 3 to 10 each show embodiments of the holding portion 30, with the gripping means 49 entering horizontally or laterally into the inside area 34. It is also conceivable for the carrier elements 20 to comprise a lower holding portion 30 with at least one opening 40 in the bottom side. In this case, the gripping means 49 enters into the inside area 34 from below. Furthermore, embodiments are conceivable wherein first gripping means enter into the inside area with gripping arms through openings in the bottom side and create an operative connection to corresponding first contact surfaces, while second gripping means enter into the inside area with gripping arms through lateral openings and create an operative connection to corresponding second contact surfaces. Here, attention needs to be paid that the lateral openings are arranged above the first contact surfaces to prevent collisions between the first and the second gripping means.

FIG. 5 furthermore shows the additional employment of magnetic means 70, 72. In this instance, contact surfaces 45 are allocated to first magnetic means 70 and the corresponding gripping surfaces 52 of the gripping means 49 of the production facility are allocated to corresponding magnetic means 72. In this way it is possible to create an additional magnetically locking and form-locking connection between the contact surface 45 of the carrier element and the gripping surface 52 of the gripping means 49. A combination of form lock and magnetic lock enables a particularly safe and guided transfer of the carrier element. It is possible, in particular, by using additional magnetic means 70, 72 to employ gripping means effectively that comprise only one gripping arm. The magnetic means 70, 72 furthermore enable correct positioning and a safe hold of the carrier elements.

Figure 11:
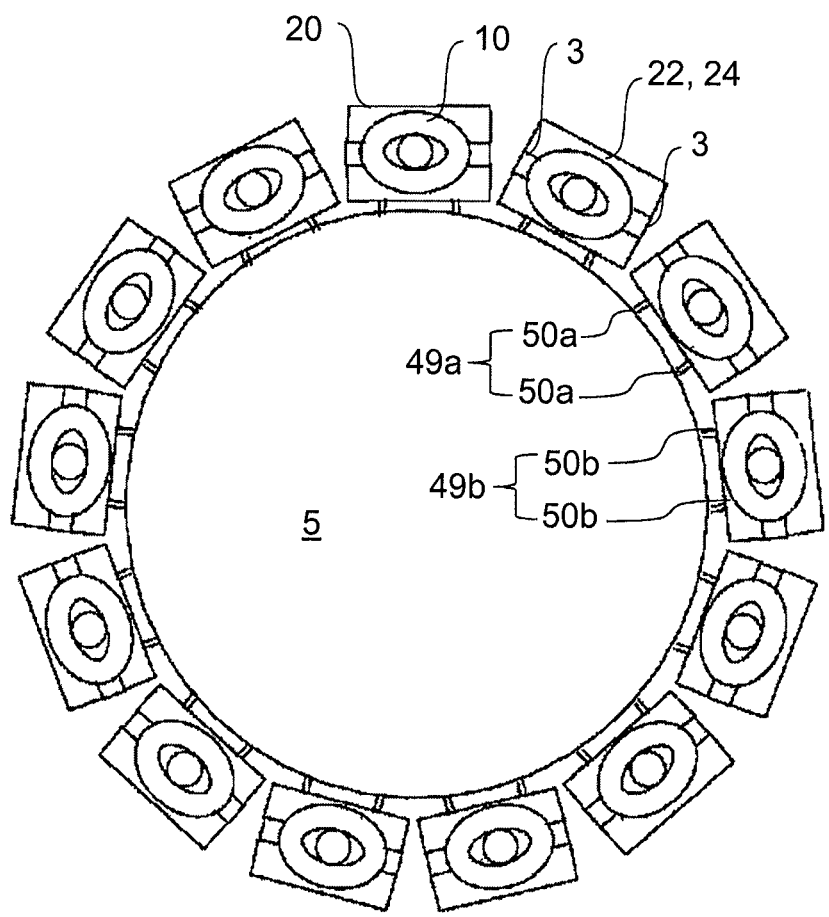
FIG. 11 shows the fastening of carrier elements according to the invention to a transport star.

FIG. 11 shows the fastening of carrier elements 20 according to the invention to a transport star 5. By employing carrier elements 20 according to the invention, wherein the gripping arms 50 of the gripping means 49 of the transportation means, for instance a transport star 5, enter into the inside area of the holding portion, it is possible to dispose the carrier elements 20 at narrower spaces than is possible according to prior art (cf. FIG. 1). In this way it is possible to receive, convey, and/or process more articles at the same time with a transport star 5 of comparative size. Alternatively, it is possible to design a smaller transport star 5 for the same load volume. It is also ensured that the adjacent gripping arm pairs 50a and 50b, each for receiving one carrier element 20 with article 10, do not interfere with each other.

Figure 12:
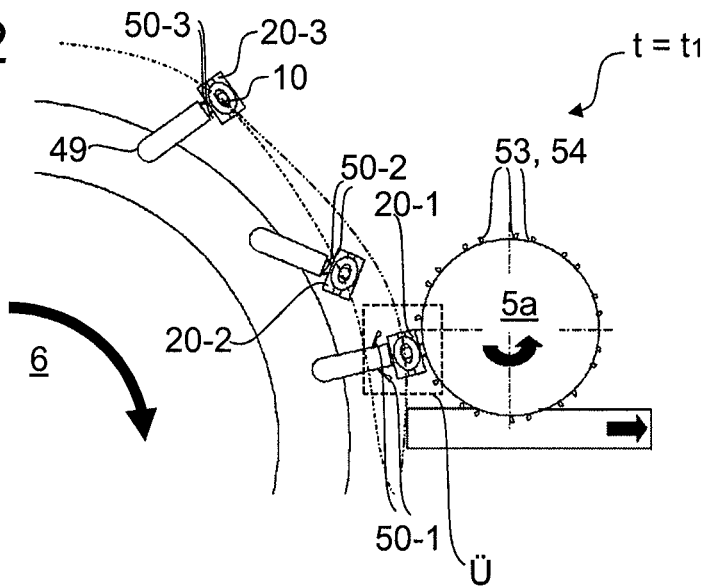
FIGS. 12 and 13 show a transportation and distribution system for carrier elements according to the invention.
Figure 13:
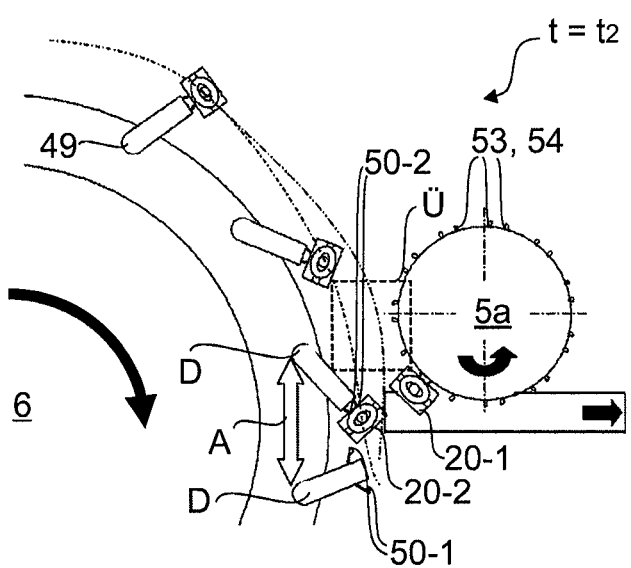

FIGS. 12 and 13 show a transportation and distribution system for carrier elements 20 according to one of the FIGS. 8 to 10. FIG. 12 shows the transfer of a carrier element 20 with article 10 from a distribution star 6 to a transport star 5a. Each of the carrier elements 20 thus comprises four functional surfaces, in particular two first functional surfaces and two second functional surfaces. Pivotable first gripping means 49 with gripping arms 50 are arranged at a distribution star 6. The gripping arms 50-2, 50-3 enter laterally into the inside area of the carrier elements 20 and form a firm connection with the first functional surfaces. In a transfer area Ü, second gripping means 53, which are arranged at a transport star 5a, enter from the opposite side into the inside area of the carrier elements 20 with their gripping arms 54 and form a firm connection with second functional surfaces between carrier element 20 and transport star 5a. The connection between the gripping surfaces 52-1 of the first gripping arms 50-1 and the first functional surfaces in the inside area of the carrier element 20 is loosened at the same time. The carrier element 20 is then held at the transport star 5a for further processing or transportation by the gripping arms 53. FIG. 12 shows the distribution system at the point of time $t=t_1$. The figure illustrates the transfer of the carrier element 20-1 with article 10 from the distribution star 6 to the transport star 5a. FIG. 13, on the other hand, shows the point of time t=t₂, with the transport star 5 not being supplied with a further carrier element 20-2 by the distribution star 6. The carrier element 20-2 with article 10 is instead transported further on in the system, for instance, to a second transport star (not illustrated here). The gripping means 50-2 has to be pivoted out of the transfer area Ü in order to avoid collisions with the adjacent gripping means 50-1. A represents the required minimal distance between the pivot points D of two adjacent gripping means 49, said minimal distance being necessary for effectively avoiding collisions between said gripping means in the transfer area Ü.

Figure 14:
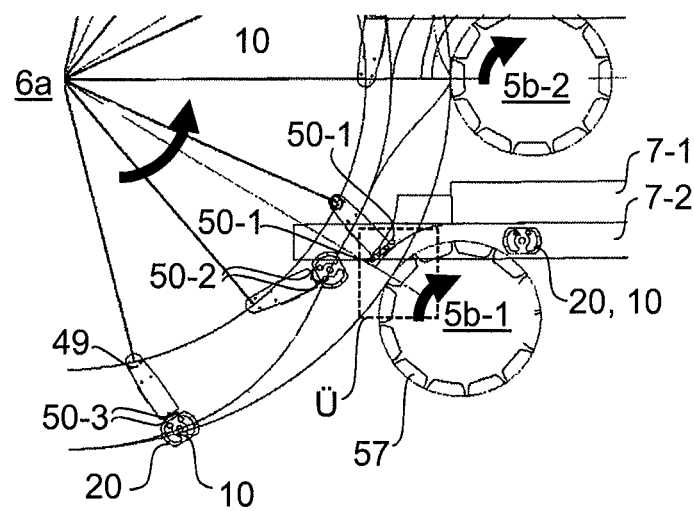
FIGS. 14 and 15 show a comparison between using a distribution star with gripping means disposed in the inside to using a distribution star with gripping means disposed on the outside.
Figure 15:
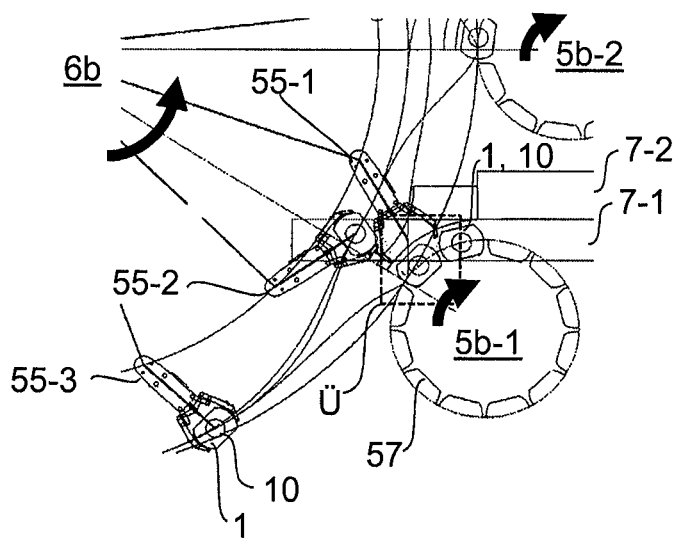

FIG. 14 and FIG. 15 show a comparison between using a distribution star 6a with gripping means 49 disposed in the inside or engaging in the inside (FIG. 14) to using a distribution star 6b with gripping means 55 disposed on the outside or engaging on the outside (FIG. 15), such as can be used for customarily known carrier elements 1. The description of FIGS. 11 and 12 can be largely referred to for the embodiment illustrated in FIG. 14. One difference lies in that the transport star 5b comprises no gripping means for the carrier elements 20. Instead, so-called transport recesses 57 are provided, which are designed correspondingly to a partial section of the carrier elements 20. The carrier elements 20 that are being fed by the distribution star 6a are each inserted into the transport recesses 57. The form- and force-locking connection between the functional surfaces in the inside and the gripping arms 50-1 is loosened and the carrier elements 20 with the articles 10 are transported in the transport recesses 57 of the respective transport star 5b to a conveyor belt 7-1, or the like. The exemplary illustration shows the transfer of one of the carrier elements 20 held by the gripping means 50-1 to a first transport star 5b-1. The carrier elements 20 are subsequently transferred to the conveyor belt 7-1 and fed to further production modules (not illustrated here) in a standing position, for instance. Alternatively, provisions can be made for the pivotable gripping means 49 to directly transfer the carrier elements 20 to a conveyor belt 7-2.

If the distribution system 6a does not supply transport element 20 to the first transport star 5b-1, but transports it further on in the system instead, for instance to a second transport star 5b-2, it is necessary to pivot the gripping means 49-2 out of the transfer area Ü of the first transport star 5b-1. This ensures that adjacent gripping means 49-1 are not touched and that the transfer to transport star 5b-1 is therefore not interfered with.

The gripping arms 56 of the gripping means 55 of the distribution star 6b illustrated in FIG. 15, by contrast, engage with the outer surfaces of carrier elements 20 from the outside. Such a distribution star 6b is therefore suitable for distributing customarily known carrier elements 1 to several other processing modules (not illustrated here). The transfer to a first transport star 5b-1 is performed largely as described in FIG. 14. In order to ensure avoiding collisions between the first gripping means 55-1 and the second gripping means 55-2, when they to do not transfer the carrier element being held to the first transport star 5b-2, but rather to the second transport star 5b-2, it is necessary to position the so-called outside engaging gripping means 55 of the distribution star 6b at greater distances from each other than are necessary for the inside engaging gripping means 49 (cf. FIG. 14).

The employment of the carrier elements 20 according to the invention together with inside engaging gripping means 49 therefore enables the construction of facilities that are smaller, more space-saving, and more cost-efficient.

Figure 16:
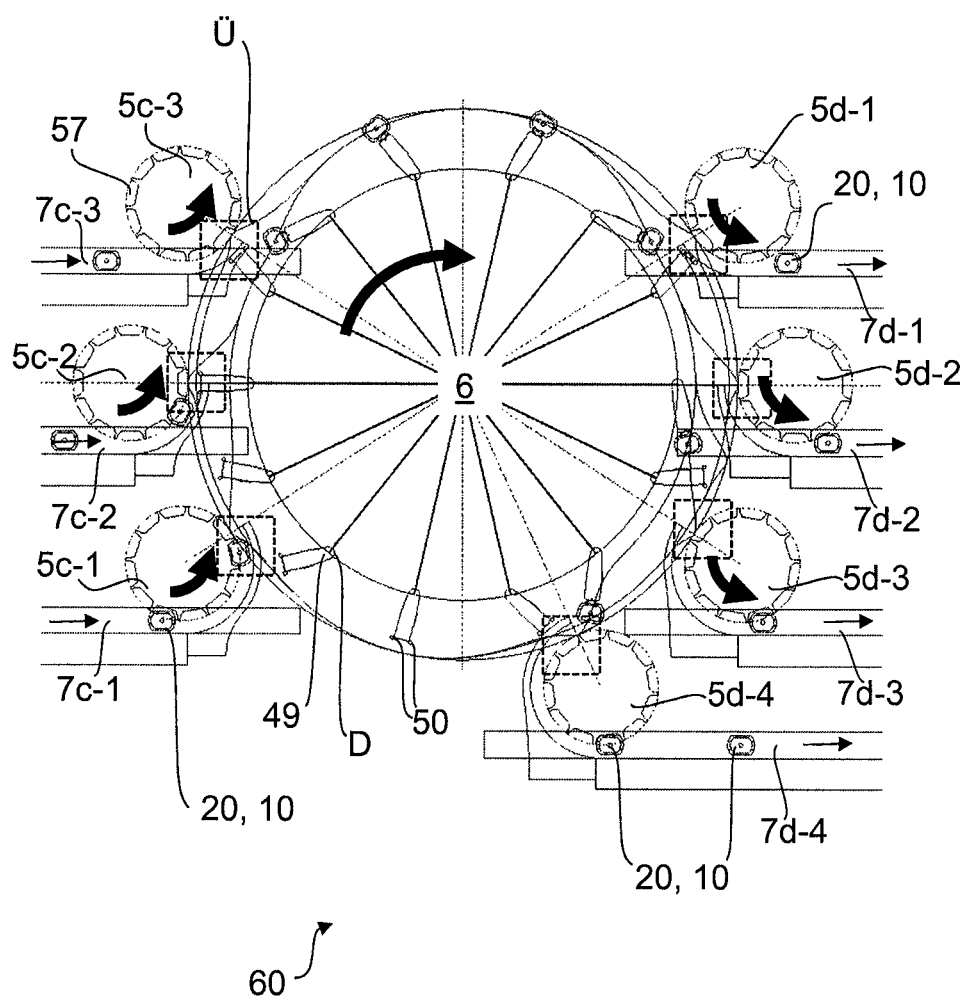
FIG. 16 once more gives an overview of a distribution system according to the FIGS. 12 to 15.

FIG. 16 once more shows an overview of a distribution system 60 according to the FIGS. 12 to 15, the said distribution system 60 in particular using carrier elements 20 according to the invention (cf. FIGS. 12 to 14). The distribution star 6 comprises corresponding gripping means 49 with gripping arms 50, which enter into the inside area of the carrier elements 20. The carrier elements 20 with articles 10 are fed to the infeed stars 5c-1, 5c-2, and 5c-3 via three infeeding conveyor belts 7c-1, 7c-2, and 7c-3. The carrier elements 20 with articles 10 are received in corresponding transport recesses 57 of the infeed stars 5c-1, 5c-2, and 5c-3 and gripped according to a predefined program by gripping means 49 of the distribution star 6. The gripping means 49 are each arranged pivotably around a pivot point D at the distribution star 6 so that each of the gripping means 49 that is not intended to be loaded can be pivoted out of the respective transfer area Ü in order to avoid collisions of adjacent gripping means 49. The carrier elements 20 with articles 10 are fed to the respective outfeed stars 5d-1, 5d-2, 5d-3, or 5d-4 according to the predefined program via the distribution star 6 and transferred by the outfeed stars to the respectively allocated conveyor belts 7d-1, 7d-2, 7d-3, and 7d-4. It is naturally also possible to use such a distribution system, with an according programming, for dividing articles from four rows into three rows or for performing other desired distributions.

Figure 17:
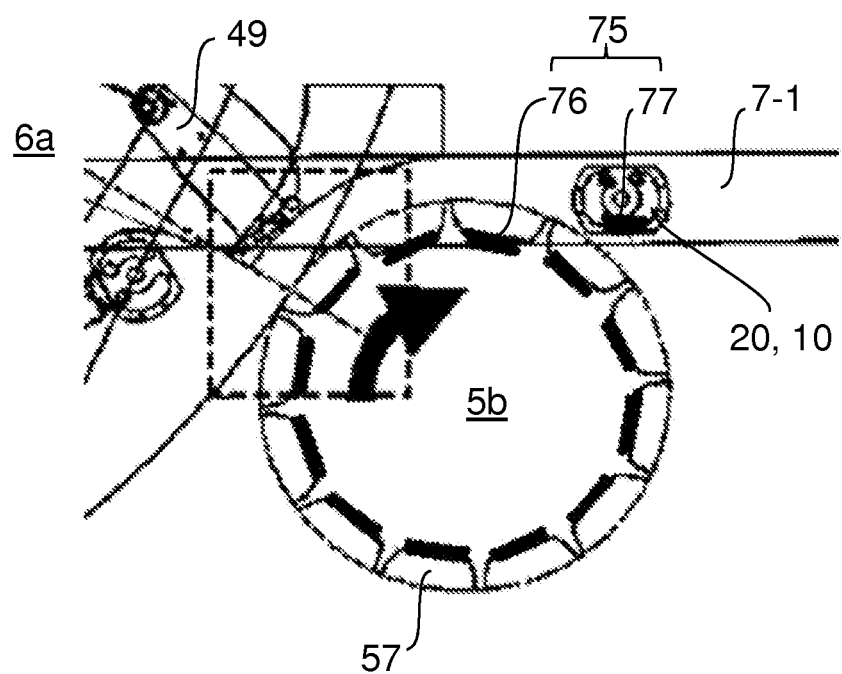
FIG. 17 shows the fastening of a carrier element according to the invention to a transport star by means of a magnetic coupling.

FIG. 17 shows a fastening of a carrier element 20 according to the invention to a transport star 5b-1 (cf. FIG. 14) in transport recesses 57 by means of a magnetic coupling 75 engaging from the outside. First magnetic means 76 are arranged in transport recesses 57, which are designed correspondingly to a partial section of the carrier elements 20. The carrier elements 20 comprise second magnetic means 77 in or at the outer casing in a section corresponding to the transport recess 57. The carrier elements 20 that are being fed by the distribution star 6a are each inserted into the transport recesses 57. The geometry of the transport recesses 57, in particular the corresponding contours of carrier element 20 and transport recess 57, serve to create a form- and force-locking connection. The magnetic means at the carrier element 20 and in the transport recess 57 create a force-locking connection. The additional magnet coupling 75 holds the carrier elements 20 safely in the transport recesses 57, even against centrifugal force, for instance. The form- and/or force-locking connection between the inside functional surfaces of the carrier element 20 and the gripping arms of the gripping means 49 of the distribution star 6a is loosened, and the carrier element 20 with the article 10 is transported to a conveyor belt 7-1, or the like, via the transport star 5b.

As described, it is thus possible to perform an alternating transfer with such a transfer means 20, wherein gripping means 49 enter from the side from a first actuating module (for instance, distribution star 6a) into the inside area of the carrier elements 20. Transfer is performed by delivering the carrier elements 20 to a further actuating module (for instance, transport star 5b) with magnetic means, which couple with a section of the outer casing of the carrier elements, said section being opposite to the section of the outer casing with the openings.

LIST OF REFERENCE CHARACTERS

1 Carrier element
2 Receiving unit
3 Adjustment device
5 Transport star
6 Distribution star
7 Conveyor belt
8 Gripping means
9 Gripping arm
10 Article 20 Carrier element
22 Receiving portion
24 Receiving opening
30 Fastening portion/Holding portion
31 Outer casing
32 Outer cover surface
33 Inside surface
34 Hollow inside area
36 Partition wall
37 Side surface
40 Opening
45 Contact surface
49 Gripping means/Clamp gripper
50 Gripping arm
51 Gripping arm
52 Gripping surface
53 Gripping means
54 Gripping arm
55 Gripping means
56 Gripping arm
57 Transport recess
60 Distribution system
70 Magnetic means
72 Magnetic means
75 Magnetic coupling
76 Magnetic means
77 Magnetic means
A Distance
AP1 First, open operating state
AP2 Second, closed operating state
t Point in time
Ü Transfer area

What is claimed is:

1. A production facility comprising:
a first processing module and a second processing module, each of the first and second processing modules having a coupling device, and
a carrier element, the carrier element for receiving and transporting articles or containers within the production facility from the first processing module to the second processing module, the carrier element comprising:
a receiving portion with a receiving opening for the article or container; and
a fastening portion arranged spatially separate from the receiving portion, the fastening portion including at least one hollow inside area of the carrier element and at least one opening in a section of an outer casing of the carrier element, the opening providing an open connection to the inside area of the carrier element, at least one functional surface being arranged in the hollow inside area of the carrier element, the functional surface making it possible to create a force-locking and/or form-locking connection to at least one of the coupling devices, the functional surface being designed as a gripping surface that can be clamped by the coupling device, the coupling device being designed as a gripper.

2. The production facility as recited in claim 1 wherein at least one of the coupling devices is inserted at least partly into the inside area of the fastening portion of the carrier element.

3. The production facility as recited in claim 1 wherein the receiving portion is arranged above the fastening portion and the receiving opening is open at the top and serves for receiving the article or container and wherein the fastening portion has a cuboid form, the opening penetrating a lateral section of the outer casing.

4. The production facility as recited in claim 1 wherein the at least one functional surface is formed to correspond to a coupling surface of the coupling device of the production facility.

5. The production facility as recited in claim 1 wherein the at least one functional surface includes two functional surfaces arranged opposite each other in the inside area of the fastening portion, the functional surfaces each designed to correspond to one coupling surface of the coupling device of the production facility.

6. The production facility as recited in claim 1 wherein the gripping surface is gripped by gripping arms with gripping surfaces of the gripper.

7. The production facility as recited in claim 1 wherein at least one functional surface includes two functional surfaces arranged at two inside surfaces of the at least one hollow area.

8. The production facility as recited in claim 7 wherein the two functional surfaces are arranged largely mirror-symmetrically at opposite inside surfaces.

9. The production facility as recited in claim 1 wherein the fastening portion comprises a stabilizing partition wall dividing the inside area into two largely identical inside areas and wherein two functional surfaces of the at least one functional surface are arranged at side surfaces of the partition wall.

10. The production facility as recited in claim 9 wherein the at least two functional surfaces are arranged largely mirror-symmetrically to a plane of symmetry formed by the partition wall and/or a plane of symmetry running in parallel to the partition wall.

11. The production facility as recited in claim 1 wherein the fastening portion is arranged below the receiving portion and wherein the at least one opening is arranged in the base section of the fastening portion so that it is possible to insert the at least one coupling device of the production facility into the carrier element from below.

12. The production facility as recited in claim 1 wherein the facility is a filling or packaging facility.

13. A production facility comprising:
a first processing module and a second processing module, each of the first and second processing modules having a coupling device, and
a carrier element, the carrier element for receiving and transporting articles or containers within the production facility from the first processing module to the second processing module, the carrier element comprising:
a receiving portion with a receiving opening for the article or container; and
a fastening portion arranged spatially separate from the receiving portion, the fastening portion including at least one hollow inside area of the carrier element and at least one opening in a section of an outer casing of the carrier element, the opening providing an open connection to the inside area of the carrier element, at least one functional surface being arranged in the hollow inside area of the carrier element, the functional surface making it possible to create a force-locking and/or form-locking connection to at least one of the coupling devices, wherein the fastening portion comprises a stabilizing partition wall dividing the inside area into two largely identical inside areas and wherein two functional surfaces of the at least one functional surface are arranged at side surfaces of the partition wall.

14. The production facility as recited in claim 13 wherein the at least two functional surfaces are arranged largely mirror-symmetrically to a plane of symmetry formed by the partition wall and/or a plane of symmetry running in parallel to the partition wall.

15. The production facility as recited in claim 13 wherein the facility is a filling or packaging facility.

* * * * *